R. H. BANISTER.
TOOL HOLDER.
APPLICATION FILED MAY 17, 1920.
1,387,339.
Patented Aug. 9, 1921.
2 SHEETS—SHEET 1.
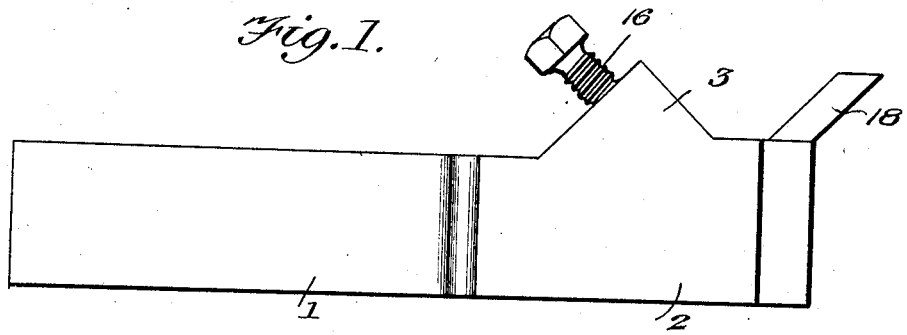
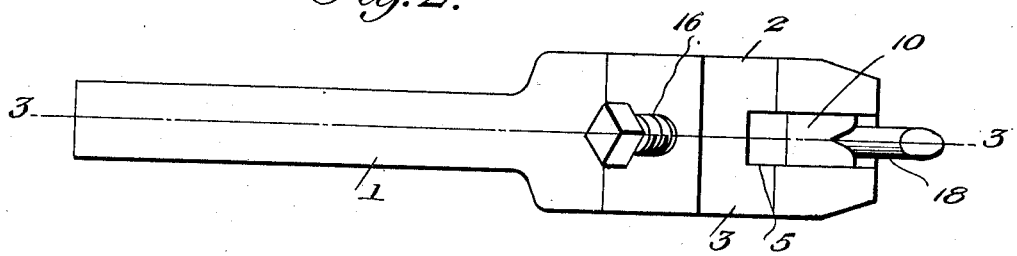
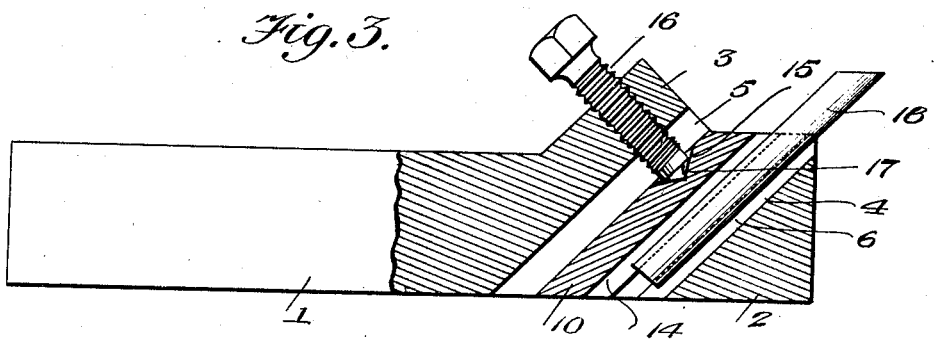
WITNESS: E. A. Buchanan.
R. H. Banister
INVENTOR
BY Victor J. Evans
ATTORNEY

R. H. BANISTER.
TOOL HOLDER.
APPLICATION FILED MAY 17, 1920.

1,387,339.

Patented Aug. 9, 1921.
2 SHEETS—SHEET 2.

R. H. Banister
INVENTOR

BY Victor J. Evans
ATTORNEY

WITNESS:

UNITED STATES PATENT OFFICE.

ROBERT H. BANISTER, OF ANNISTON, ALABAMA.

TOOL-HOLDER.

1,387,339.   Specification of Letters Patent.   Patented Aug. 9, 1921.

Application filed May 17, 1920. Serial No. 382,025.

*To all whom it may concern:*

Be it known that I, ROBERT H. BANISTER, a citizen of the United States, residing at Anniston, in the county of Calhoun and State of Alabama, have invented new and useful Improvements in Tool-Holders, of which the following is a specification.

The present invention has reference to a tool holder for lathes or other metal working machines.

The primary object is to produce a holder for this purpose which will effectively grip round tools, holding the same with their points at any desired angular position with respect to the holder, so that a single tool can be employed for straight or right and left hand cutting.

A further object is to produce a tool holder in which an angle jaw is fixed in the slotted head of the holder and in which a loose jaw is also arranged in the slotted head and held loosely therein by removable means, the head carrying an adjustable binding element arranged angularly with respect to the movable jaws and designed to bind thereagainst to adjust and retain the movable jaw with respect to the fixed jaw.

A further object is to produce a tool holder provided with a slotted head, in which the outer wall of the slot is grooved, a movable jaw having its active face grooved longitudinally and also arranged in the slotted head, a removable element passing through a depression in the side of the movable jaw for retaining the same in the slotted head, and an angularly disposed adjusting screw is carried by the head and contacts with the rear straight wall of the movable jaw for adjusting and holding the same against the grooved wall of the head.

The foregoing objects, and others which will appear as the nature of the invention is better understood, may be accomplished by a construction, combination and operative arrangement of parts, such as is disclosed by the drawings.

In the drawings:—

Figure 1 is a side elevation of the improvement.

Fig. 2 is a top plan view thereof.

Fig. 3 is a sectional view approximately on the line 3—3 of Fig. 2.

Figure 4:
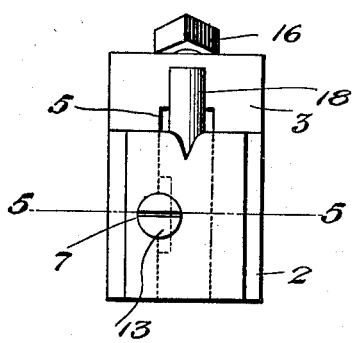
Fig. 4 is an end view of the improvement.
Figure 5:
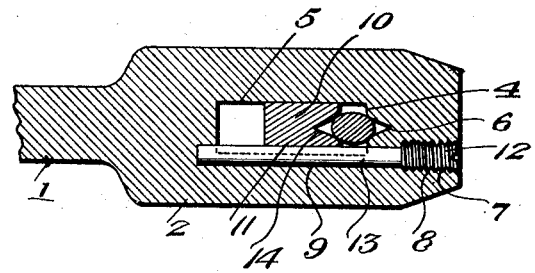
Fig. 5 is a sectional view approximately on the line 5—5 of Fig. 4.
Figure 6:
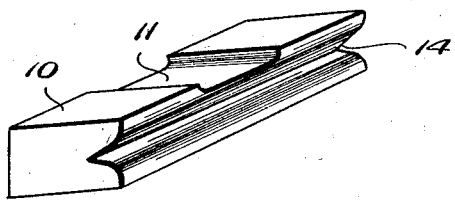
Fig. 6 is a perspective view of the movable jaw.
Figure 7:
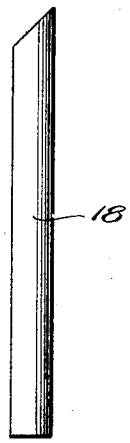
Fig. 7 is a view of the tool.

My improvement includes a shank 1 having a head 2 at one end thereof. The shank is fixed in the usual manner to the post of the machine.

The head is arranged in the same plane as the shank, but is thicker than the shank, and the said head, upon its upper face, inward of its outer end is provided with an angle extension 3. The portion of the head outward of the extension is preferably wider than the portion thereof inward of the said extension, the latter being of the same width as the shank.

The head 2 is centrally provided with a slot defining inner and outer end walls which are arranged at an angle and which are parallel. As the holder is designed to be made of some hard carbonized steel the fixed jaw may be integrally formed with the holder. The fixed jaw, in the present instance comprises the outer angle wall 4 of the slot 5. The jaw 4 is provided with a longitudinal V-shaped groove 6 which may be widened at the ends thereof.

The outer end of the head 2, in a line with one of the side walls of the slot 5 has a round opening 7 therethrough, the opening forming a depression in the referred to side wall of the slot. The opening at the outer portion thereof has its bore threaded as at 8, and for distinction the groove in the side wall of the slot 5 is indicated by the numeral 9.

In the slot 5 is the movable jaw 10. The movable jaw is in the nature of a substantially rectangular metal plate that has its ends cut at the same angle and that has one of its sides grooved or recessed as at 11. This recessed side of the movable jaw is designed to be arranged next to the grooved wall of the slot 5, and passing through the opening 7 received in the groove 9, and having its threaded end 12 engaging with the threads 8, is a pin 13 that loosely holds the movable jaw in the slotted head of the holder. The movable jaw has its active face grooved longitudinally as at 14 and its rear straight face provided with a cup-shaped depression 15. The angle portion 3 of the holder has a threaded opening entering from the rear wall thereof into the slot 5. In the threads of this opening is screwed a headed bolt 16. The bolt has its inner end conical as at 17, and this cone shaped end is received in the cone shaped depression 15 in the inner face of the jaw 10. By adjusting the bolt 17 it will be apparent that the jaw 10 may be adjusted with respect to the fixed jaw 3.

With my improvement broken drills, broken taps or cross sectionally rounded bars may be used for drills. One of such drills 18 is illustrated in detail in the drawings. The drill is sharpened by beveling one end thereof as at 19.

Figure 8:
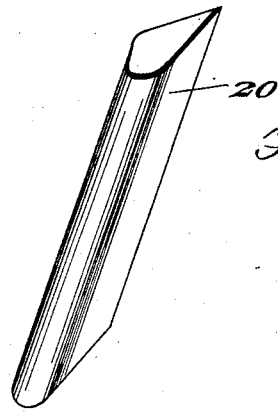
Fig. 8 is a similar view of another tool which may be employed.

In addition to the tool as above described my holder will be found especially useful in connection with a threading tool 20 illustrated in Fig. 8. This tool may be made of any scrap material which is properly tempered and has one of its faces round and its other pointed, its sides being beveled from its said rounded end to the center of the said pointed end. The rounded surface is received in the groove of the stationary jaw and the angle surface is received in the groove of the movable jaw. Both of the ends of the tool 20 are beveled in the same direction providing a rounded cutting point on one of its ends and a beveled cutting point on the other end.

It is believed that the foregoing description, when taken in connection with the drawings will fully set forth the construction and advantages of the improvement, as well as the simplicity thereof to those skilled in the art to which such inventions relate, so that further detailed description is not deemed necessary.

Having thus described the invention, what I claim is:—

A tool holder comprising a member including a shank and a head at one end of the shank, said head having an angle extension on the upper face thereof and having an inwardly directed downwardly inclined slot entering from its upper and outer corner and also entering the angle extension, the outer wall provided by the slot having a longitudinal V-shaped groove therethrough, a threaded element entering the head in a line with one of the walls of the slot thereof, a plate comprising a movable jaw arranged in the slot of the head and having a groove on one side thereof receiving therethrough the said element, said movable jaw having its active face provided with a V-shaped groove, and its rear and inactive face provided with a cup-shaped depression, the extension of the head having an angle threaded opening therethrough communicating with the slot, and a headed threaded element having a cone-shaped end engaging the threads of the said opening and received in the cup-shaped groove on the rear face of the movable jaw.

In testimony whereof I affix my signature.

ROBERT H. BANISTER.